UNITED STATES PATENT OFFICE 2,481,492

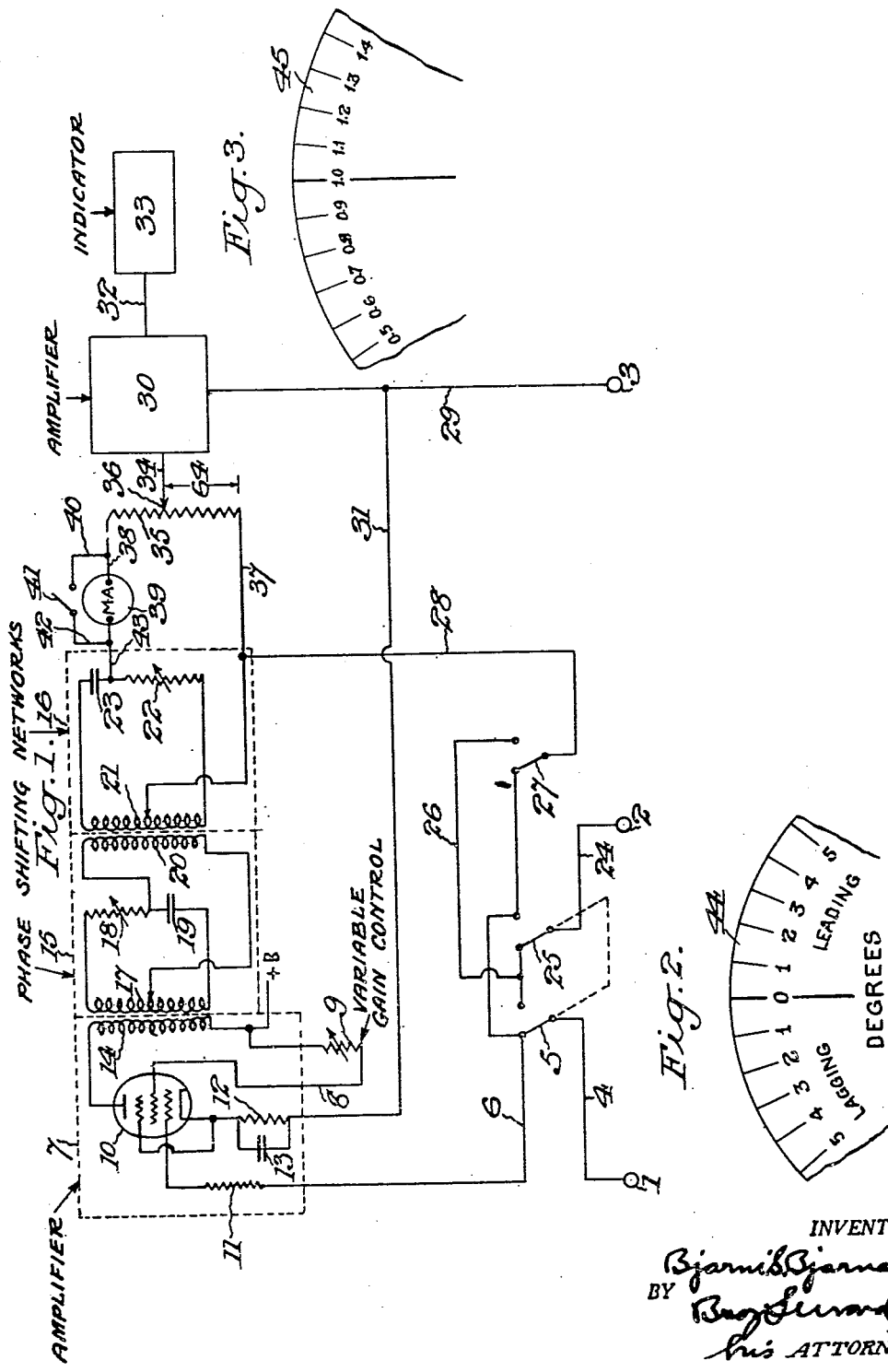

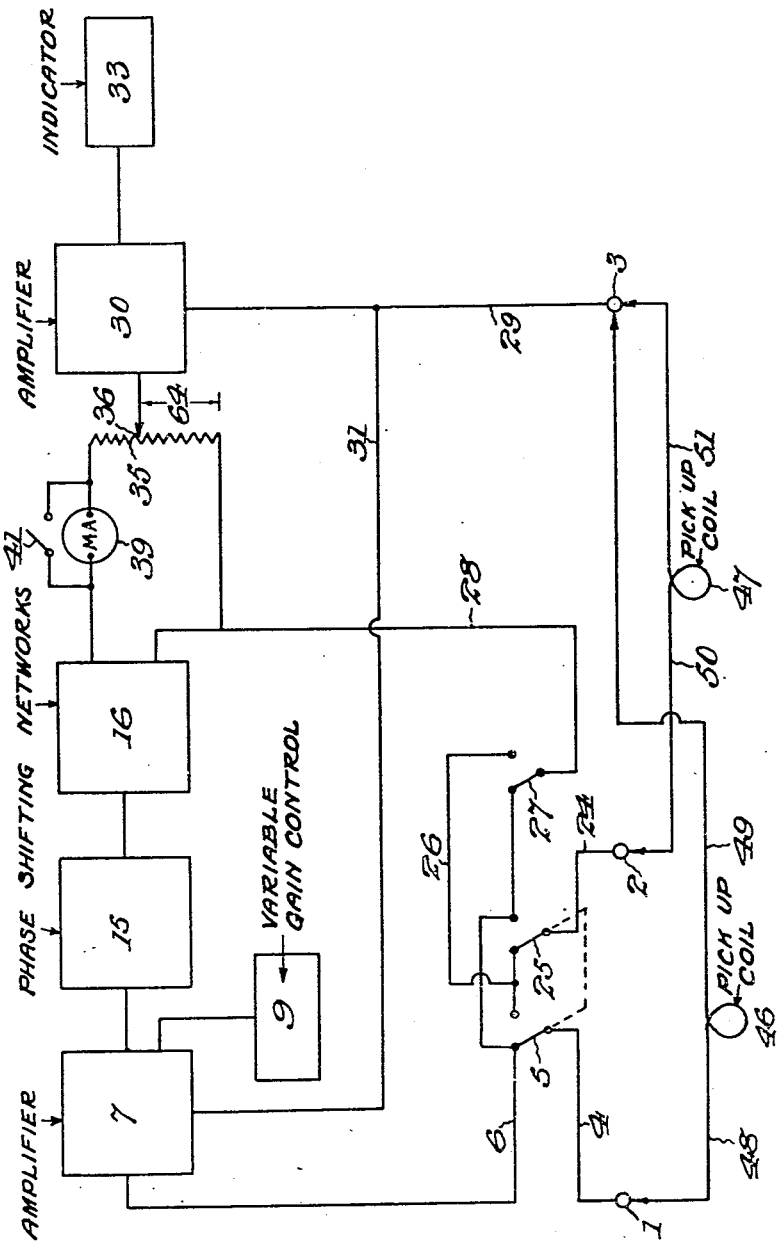

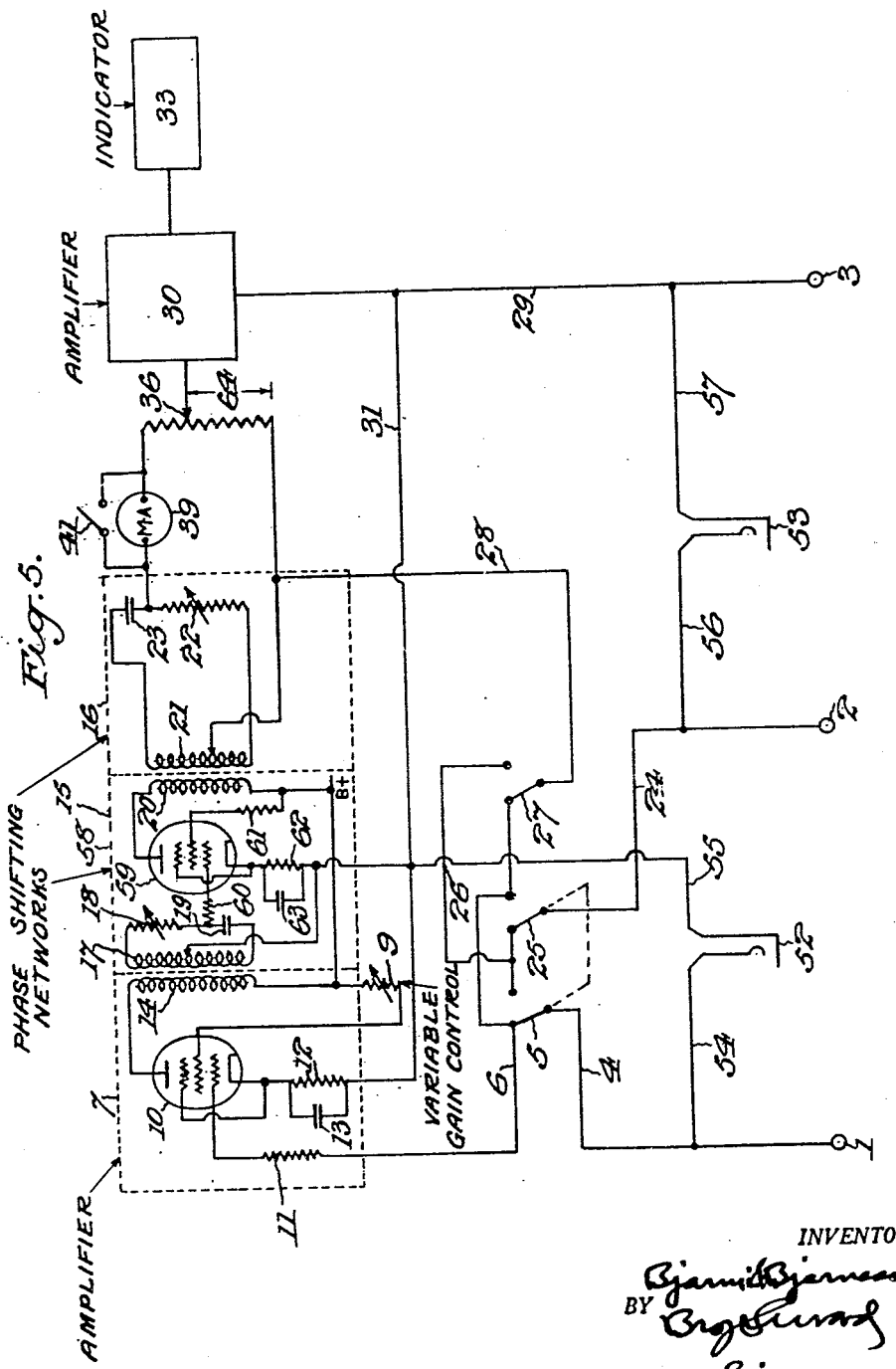

INTENSITY, INTENSITY RATIO, AND PHASE DIFFERENCE MEASURING SYSTEM FOR GEOPHYSICAL PROSPECTING

Bjarni S. Bjarnason, Toronto, Ontario, Canada, assignor to Hans T. F. Lundberg, Toronto, Ontario, Canada Application June 7, 1945, Serial No. 598,118

12 Claims. (Cl. 172—245)

This invention relates to an electrical measuring instrument and, particularly, to an instrument for measuring and comparing the magnitude and phase relationship of alternating current potentials and the intensity, phase relationship, and relative positioning of alternating magnetic fields, which is especially fitted for utilization in connection with geophysical investigations of the electric, magnetic, and electromagnetic types.

An object of the invention is to provide an instrument which is so designed and constructed as to supply information of the character above named without the necessity of independent calculation by the operator.

Another object is to provide such an instrument which will determine the value or magnitude of an electrical potential in question and also determine the relative values or magnitudes of a plurality of potentials.

Another object is to provide such an instrument which will determine the absolute value or magnitude of an alternating electric potential in question with relation to a standard or reference electric current, the value of which current is dependent upon the magnitude of a potential that is predetermined and fixed in the design and construction of the instrument.

Another object is to provide such an instrument which will determine the relative values or magnitudes of a plurality of electrical potentials without reference to or comparison with a standard potential or current.

Another object is to provide such an instrument which will determine and compare the intensity of alternating magnetic fields and their relative positions in space.

Another object consists in providing such an instrument which will determine and compare the intensities of vertical and horizontal components of alternating magnetic fields at a chosen point or points of observation.

Another object consists in providing such an instrument which will determine and compare the phase difference between two vertical and two horizontal components of alternating magnetic fields at chosen points of observation.

Another object consists in providing such an instrument which will determine magnitudes of horizontal and vertical components of alternating magnetic fields at one or more chosen points of observation, from which the resultant intensity or intensities may be obtained and the phase angle relation of the resultants in both horizontal and vertical planes may be determined.

Another object consists in providing such an instrument which will determine and compare the intensity of the resultant of primary and secondary alternating magnetic fields as related to elliptic polarization.

Another object consists in providing such an instrument which includes within itself the capacity for performing all the measurements and determinations hereinabove recited with respect to both potentials and alternating magnetic fields.

Another object consists in providing such an instrument which is not handicapped by complexity of structure, and which may be manipulated by one skilled in this art in a simple and expeditious manner.

A further object consists in providing certain improvements in the form, construction, arrangement, and material of the several parts of the instrument, whereby the above named and other objects may be effectively attained.

Practical embodiments of the invention are diagrammatically represented in the accompanying drawings, in which Fig. 1 represents the instrument as adapted to measurements and comparisons respecting the magnitudes and phase relationships of alternating potentials;

Fig. 2 represents a section of the phase dial on a phase shifting network constituting part of the instrument;

Fig. 3 represents a section of the ratio dial on a potentiometer control device constituting part of the instrument;

Fig. 4 represents a slightly modified form of the instrument shown in Fig. 1 whereby it is adapted to measurements and comparisons respecting the intensities, phase relationships, and relative positions in space of components of alternating magnetic fields; and Fig. 5 represents a second modified form of the instrument whereby it is fitted to perform the functions of the instruments shown in both Figs. 1 and 4.

Referring to the form shown in the first three figures, the instrument includes three pickups denoted by 1, 2 and 3, which may be of any well known and approved form and construction arranged for contact with the earth and the picking up of electric potential existing at the point of contact.

Pickup 1 is connected by a wire 4 to an arm 5 of a double pole double throw switch, which arm is adapted to connect wire 4 to a wire 6 which leads to an amplifier 7 (shown in broken lines)

that is of the variable gain type due to its connection by a wire 8 to an amplifier gain control 9, which may be a variable resistance. The amplifier 7 includes a tube 10, resistances 11, 12, condenser 13, and primary transformer coil 14, all of which are connected with each other and with the battery B as shown in the drawing. It will be observed that wires 6 and 8 are connected to two of the grids of the tube 10. The filament supply for the tube is not illustrated, but it may be said that the tube could be of the direct heater type using a C battery for bias, or the indirect heater type.

The variable gain amplifier 7 is in electrical connection with a phase shifting network 15 (represented in broken lines) which is of the constant potential amplitude type; and said network 15 is in electrical connection with a second phase shifting network 16 (likewise represented in broken lines). The network 15 includes adjustable secondary transformer coil 17, phase control 18 (which may be a variable resistance), condenser 19, and primary transformer coil 20; while network 16 includes adjustable secondary transformer coil 21, phase control 22 (which may be a variable resistance), and condenser 23; all said parts being interconnected as shown in the drawing.

Pickup 2 is connected by a wire 24 with an arm 25 of the double pole double throw switch that also includes the arm 5; which arm 25, when thrown to the left in Fig. 1, serves to connect the wire 24 with a wire 26 which leads to one terminal of a single throw double pole switch 27 which, when thrown to the right in Fig. 1, makes wire 26 connect with a wire 28 and thereby establishes connection between pickup 2 and phase shifting network 16.

Pickup 3 is connected by a wire 29 with a second amplifier 30, and by a branch wire 31 with amplifier 7. Amplifier 30 is merely shown in outline as its construction may be similar to amplifier 7 with the omission of gain control 8.

The amplifier 30 is connected, by a wire 32, with an indicator 33 of suitable form and capacity such, for instance, as an output meter designed for zero signal indication, or head phones adapted to give a minimum response under zero potential input condition of amplifier 30. The said amplifier 30 is also connected by a wire 34 with a potentiometer 35.

The potentiometer 35 is provided with a suitable control indicated at 36 for adjusting the voltage across the lower section thereof, as hereinafter explained, and has one end connected by a wire 37 with wire 28 which leads from switch 27 to the phase shifting network 16. The other end of potentiometer 35 is connected by a wire 38 with a milliammeter 39, and by a wire 40 with one terminal of a single pole single throw switch 41 that is, in turn, connected by a wire 42 with a wire 43 which establishes connection between the milliammeter 39 and the phase shifting network 16.

The phase control 22 in network 16 is provided with a phase dial 44, represented in Fig. 2, which is calibrated directly in degrees to show a zero condition, a lagging condition, or a leading condition of the potential being measured with respect to the reference potential; and the potentiometer control 36 is provided with a ratio dial 45 which reads in tenths and is calibrated in suitable units, such as volts, in such a way that its dial reading, when multiplied by the reading of milliammeter 39, will give the absolute value of a potential being measured, with reference to a standard current passing through the milliammeter. This standard or reference current may be predetermined and fixed in the design and construction of the instrument by appropriate arrangement of the circuit parameters and the selection of a milliammeter having an adequate and appropriate range as well as characteristics suitable to its employment in this connection.

The form of my invention represented in Fig. 4 is the same as that shown in Fig. 1 except that the wires terminating at the pickups 1, 2 and 3 are connected to a pair of induction pickups, such as suitable coils 46, 47, which, in the use of the instrument, would be appropriately located in the magnetic fields under investigation. It will be observed that pickup coil 46 is connected by a wire 48 to pickup 1 and by a wire 49 to pickup 3; whereas pickup coil 47 is connected by a wire 50 to pickup 2 and by a wire 51 to pickup 3.

The form of my invention represented in Fig. 5 differs from the forms shown in Figs. 1 and 4 to the extent that it combines or embodies the capacities of the two other forms of the invention by providing the three contact pickups 1, 2, 3, as well as two plug-in jacks 52, 53, which may be connected with the coil pickups 46, 47, as desired. The jack 52 is connected by a wire 54 to pickup 1 and by a wire 55 to the wire 31 which, as hereinabove described, is in connection with pickup 3; while jack 53 is connected by a wire 56 to pickup 2, and by a wire 57 to pickup 3. The form shown in Fig. 5 further differs from the forms shown in Figs. 1 and 4 in that the phase shifting network marked 58, which takes the place of network 15 in Figs. 1 and 4, includes, in addition to the elements of network 15, an amplifying tube 59, resistances 60, 61, 62, and condenser 63; all the said elements being interconnected as shown in Fig. 5.

Before proceeding to a brief description of the operation of the different forms of the invention herein shown and described, it may be mentioned that the double throw switch 27, when thrown to the left, as indicated in Fig. 1, permits the potential from a given source to be applied simultaneously and directly to the inputs of amplifiers 7 and 30 for the purpose of instrument calibration or individual potential measurement. If the double pole double throw switch 5, 25, is thrown to the left as indicated in Fig. 1, the said potential applied to amplifiers 7 and 30 will be that existing between pickups 1 and 3; whereas, if the said switch 5, 25, should be thrown to the right in Fig. 1, the said potential would be that existing between pickups 2 and 3. With switch 27 and the double switch 5, 25 both thrown to the left, as indicated in Fig. 1, the unknown potential existing between pickups 1 and 3 may be measured; and, if the said switch 27 be thrown to the right in Fig. 1, while the double switch 5, 25 remains thrown to the left, the unknown potential between pickups 2 and 3 may be measured to ascertain its value and/or for comparison with the previously measured potential existing between pickups 1 and 3.

Assuming the instrument as shown in Fig. 1 to be set up for operation with the pickups 1, 2 and 3 located at selected points on the ground, the operator may proceed to the measurement of the potential existing between pickups 1 and 3. This potential will be applied to the amplifiers 7 and 30 as already described and, as the output of the phase shifting network 16 is connected in series with the milliammeter 39 and the potentiometer 35, the potential developed across the potentiometer will be dependent on the current flowing in the potentiometer winding as recorded by the milliammeter and will therefore correspond to the regulation or adjustment of the amplifier gain control 9. The phase shifting network 15 may be adjusted to compensate for any phase shift that takes place in amplifier 7 and output network 16 in order to make sure that the potential developed across the potentiometer 35, as derived from the phase shifting network 16, is exactly opposite in phase to the potential between pickups 1 and 3. The control 36 on potentiometer 35 may now be adjusted until the potential across the section of the potentiometer denoted by 64 is equal in magnitude to the potential existing between pickups 1 and 3. As the foregoing steps will result in the said two potentials being opposite in phase and equal in magnitude, they will cancel each other and bring about a zero potential condition across the input of amplifier 30. This condition of zero potential may be observed from indicator 33 by the zero signal of its meter or the minimum response in its head phones.

The operator may now observe the value or magnitude of the potential between pickups 1 and 3 by noting the setting of the potentiometer control 36 and the reading of milliammeter 39, having in mind that, as heretofore mentioned, the dial 45 on the control is so calibrated that its reading, when multiplied by the reading of the milliammeter, gives the absolute value or magnitude of the potential being measured with reference to the standard current established for the milliammeter. The milliammeter may be calibrated so that the potentials may be measured either in terms of peak voltages or RMS values.

If, now, the operator desires to measure the value or magnitude of the potential between pickups 2 and 3 and to compare this potential in magnitude and phase with the potential between pickups 1 and 3, he may proceed as follows: Leave all the switches in the position shown in Fig. 1, i. e. switch 27 thrown to the left, double switch 5, 25 thrown to the left, and switch 41 open. Set the phase dial 44 on the phase shifting network 16 to zero degrees, as shown in Fig. 2, and set the ratio dial 45 on potentiometer control 36 to 1.0, as shown in Fig. 3. Adjust amplifier gain control 9 and the control 18 on phase shifting network 15 until the indicator 33 reacts with a zero signal, and note the reading of milliammeter 39. The switch 27 should now be thrown to the right and the dial 44 on phase shifting network 16 be adjusted in conjunction with adjustment of the dial 45 on control 36 until the indicator 33 again reacts with a zero signal, at which time the readings of the said dials are noted. The reading on the control dial will be the ratio of the magnitude of the potential between pickups 2 and 3 to that between the pickups 1 and 3, which may be represented by $$\frac{2-3}{1-3}$$

while the reading on the dial of phase shifting network 16 will be the actual phase angle difference in degrees of the potential between pickups 2 and 3 and the potential between pickups 1 and 3, when using the last named potential as the standard or reference potential.

Thus it will be seen that the potential between pickups 1 and 3 may be used as a reference potential for measurement of, and/or comparison with, the magnitude of the potential between pickups 2 and 3, when the double switch 5, 25 is thrown to the left and the switch 27 is thrown to the right; while the potential between pickups 2 and 3 may be used as the reference potential for instrument calibration and/or measurement of potential between pickups 1 and 3, when the double switch 5, 25 is thrown to the right and the switch 27 is thrown to the left. It should be added that the phase shifting networks 15 and 16 may be employed to establish a phase reference for angle measurements, by setting the phase dial 44 to zero degrees and adjusting the phase control 18 on network 15 until the potential derived from network 16 is opposite in phase to the potential between pickups 2 and 3. Consequently, with the double switch 5, 25 thrown to the left and the switch 27 also thrown to the left, the potential between pickups 1 and 3 can serve as the phase reference potential as well as the reference potential; while the potential between pickups 2 and 3 may also be employed as a phase reference potential as well as a reference potential when conditions call for such use of the instrument.

If the operator should desire to compare the magnitudes or values of two alternating potentials, i. e. voltages, without regard to their absolute values, the above described procedure may be followed with the exception that switch 41 should be closed in order to shunt out milliammeter 39 since there is no need to measure the current through potentiometer 35, but the uniformity or constant value of the current through potentiometer 35 should be insured by rechecking the zero signal of indicator 33 with switch 27 thrown to the left in Fig. 1 immediately following the completion of the above described procedure with switch 27 thrown to the right. This uniform current, value unknown, through potentiometer 35 may be used as a reference level when comparing the magnitudes of two alternating potentials. For example, if it is desired to compare the magnitude of the potential across pickups 2—3 with that across pickups 1—3, the potential ratio equals $$\frac{2-3}{1-3}$$

Now set double switch 5, 25 and single switch 27 to the left position, set ratio dial 45 at 1.0, set phase dial 44 at 0, and adjust gain control 9 and phase control 18 until zero signal is observed on null indicator 33. Then throw switch 27 to the right and adjust controls 22 and 36 for zero signal condition. Recheck zero signal setting by throwing switch 27 to the left. The ratio of the magnitudes of the two alternating potentials may now be read directly on dial 45, and the phase angle may be read on dial 44 if desired.

Referring now to the modified form of instrument shown in Fig. 4, the procedure followed in using this instrument is the same as that described in connection with the form shown in Fig. 1, but the determinations made and information received differ in that the form of instrument shown in Fig. 4 is adapted to the measuring and comparing of intensities and phase relationships of alternating magnetic fields and their relative positions in space as encountered, for instance, in inductive electromagnetic geophysical exploration.

In this form of instrument represented in Fig. 4, the potential pickups are coils or other suitable devices of the inductive type, and they are properly located and oriented by the operator in the alternating magnetic fields in question at the outset of the investigation. By handling this instrument of Fig. 4 as hereinabove described with respect to the instrument of Fig. 1, the operator may (a) measure and compare vertical and horizontal components of intensity of magnetic fields at any desired point or points of observation; (b) determine the intensity of the resultant of primary and secondary magnetic fields with respect to elliptic polarization; (c) study and determine the characteristics of a magnetic field at any desired point of observation by separate and individual use of the pickups 46 and 47.

The modified form of instrument illustrated in Fig. 5, enables the operator to obtain by its use alone all the measurements, determinations and results that are obtainable with the use of both forms of instrument shown in Figs. 1 and 4. In other words, the instrument of Fig. 5 in itself combines the availability, utility, and capacities of the two instruments represented in Figs. 1 and 4, and it is particularly useful in measuring and/or comparing the magnitudes of alternating potentials and alternating magnetic fields.

While the mode of operation of the instrument in this kind of investigation is the same as that previously described, there is a difference with respect to the manner in which the pickups 46 and 47 (with which, as above stated, the plug-in jacks 52, 53 may be connected) are oriented when measuring or comparing the magnitudes of alternating magnetic fields. These pickups are preferably coils which are wound with many turns of copper wire and may be identical with respect to the number of turns of wire and their electrical characteristics, which data are available from a knowledge of the design and construction of the coils and should be accurately known by the operator.

If it be assumed that only one of the pickups, e. g. 46, is to be employed when investigating an alternating magnetic field at a selected point of observation, the operator will throw double switch 5, 25 and switch 27 both to the left and will connect pickup 46 with plug-in jack 52. To determine the magnitude of the vertical component of the field, pickup 46 should be located with the side of its coil in the horizontal plane of the field, following which the procedure for adjusting the various controls of the instrument should be carried out as hereinabove described, with the result that the potential observed on the instrument represents the electromotive force induced in the coil of the pickup by the alternating magnetic field in which it is located. Knowledge as to this electromotive force, coupled with knowledge as to the number of turns of wire on, and the electrical characteristics of, the coil of the pickup, as hereinabove mentioned, together with the frequency of the alternating magnetic field, enables the operator to deduce the magnitude of the vertical component of the said field.

To determine the magnitude of the horizontal component of the field, pickup 46 should be located with the side of its coil in the vertical plane of the field, and the above described procedure or method of adjusting the controls on the instrument should be repeated. Whereupon the operator can learn the value of the horizontal component of the field in the same manner as the vertical component. Following this, the intensity of the alternating magnetic field can be obtained by vectorially combining the previously determined vertical and horizontal components; while the relative position of the resultant vector in space may also be determined from the data in hand.

The same information as to the alternating magnetic field may be obtained by connecting either of the pickups 46 or 47 with plug-in jack 53, provided that the double switch 5, 25 is thrown to the right.

In case it is desired to measure and/or compare the magnitudes of an alternating magnetic field or fields at any two selected points of observation, and to measure the phase difference between the horizontal and vertical components of their intensities, the operator may proceed as follows:

For measuring and/or comparing the vertical intensities, the pickup coils 46 and 47 should be located in horizontal planes, be connected with the plug-in jacks 52 and 53, and the instrument be adjusted and operated in the same way as hereinabove described for potential measurements. If the double switch 5, 25 is thrown to the left, the electromotive force developed across the coil of the pickup connected with plug-in jack 52 furnishes the reference potential, whereas, if the double switch 5, 25 is thrown to the right, the electromotive force developed across the coil of the pickup connected with plug-in jack 53 furnishes the reference potential. The intensities and comparisons of the magnitudes of the intensities, as well as the phase relations of the fields, may be determined from the readings thus obtained on the instrument.

Measurements and comparisons of the horizontal intensities may be made in a similar manner except that the pickup coils 46 and 47 must be located in vertical planes and each properly oriented about its vertical axis with respect to the directions of the magnetic fields. The resultant intensity of the field or fields at any selected point of observation may be learned by vectorially combining the vertical and horizontal components of intensities obtained by the use of the instrument as described; and the resultant intensities at any two selected points may be compared as to magnitudes and relative positions in space, i. e., phase relationships.

The resultant of two alternating magnetic fields, such as a primary and secondary field, may be determined from observations made with the instrument as hereinabove described; and data as to the elliptic polarization of electromatic fields may be obtained by correlating the results of the observations.

In respect to all three forms of this instrument, herein shown and described, it should be mentioned that, when making phase angle measurements, the frequency of the potential or alternating magnetic field under investigation needs to be known; whereas, in making measurements of the values or magnitudes of alternating potentials, the desired results may be obtained regardless of their frequency.

From the foregoing it will be observed that this invention provides an instrument which, in itself, has the capacity and flexibility for direct measurements of phase angle between alternating potentials; direct measurements or comparisons of alternating potentials; direct measurements or comparisons of the magnitude of alternating magnetic fields; and direct measurements of phase angle between two alternating magnetic fields at any two selected points of observation. As the instrument is direct reading, i. e., phase angle, ratio or voltage may be read directly on the phase dial and ratio dial in conjunction with the milliammeter, required calculations leading to definitive results are reduced to a minimum with corresponding simplification in the mode of operation of the instrument. Furthermore, no standard source of potential such, for instance, as a standard cell, need be supplied for reference when calibrating the instrument, because the latter is so designed that it can utilize as a reference potential either the single potential which is to be measured or one of a plurality of potentials which are to be measured, in comparisons of magnitudes of potentials and alternating magnetic fields; while the phase shifting networks embodied in the instrument may be employed to establish a phase reference for angle measurements. Finally, the instrument is compact and easily portable for geophysical exploration; and it may be so designed and constructed that its operation absorbs only a negligible amount of energy from the source being measured, thus enabling the attainment of more accurate measurements than is possible with instruments which absorb a substantial or considerable amount of energy from the source, e. g., potential or alternating magnetic field, being measured.

While this invention is especially designed and intended for geophysical prospecting, it is capable of application to wider fields of use.

It will also be understood that various changes may be resorted to in the form, construction, arrangement and material of the instruments and in the steps followed in using the same, without departing from the spirit and scope of my invention; and hence I do not intend to be limited to the details herein shown and described except as they may be included in the claims or required by disclosures of the prior art.

What I claim is:

1. An instrument of the character described adapted to present a picked up potential in phase opposition to another potential comprising, a variable gain amplifier, a phase shifting network having its input electrically connected with the output of said amplifier, a second phase shifting network having its input electrically connected with the output of the first named network, at least one of said networks being provided with an adjustable phase control, a potentiometer electrically connected across the output of said second network, whereby the strength and phase of the current across the potentiometer may be regulated, a second amplifier having its input electrically connected with said potentiometer, a plurality of potential pickups, and means for electrically connecting said pickups with said amplifiers.

2. An instrument of the character described adapted to present a picked up potential in phase opposition to another potential comprising, a variable gain amplifier, a phase shifting network having its input electrically connected with the output of said amplifier, a second phase shifting network having its input electrically connected with the output of the first named network, at least one of said networks being provided with an adjustable phase control having an indicating dial, a potentiometer electrically connected across the output of said second network, whereby the strength and phase of the current across the potentiometer may be regulated, an adjustable current control for said potentiometer provided with an indicating dial, a second amplifier having its input electrically connected with said potentiometer control, a plurality of potential pickups, and means for electrically connecting said pickups with said amplifiers.

3. An instrument of the character described adapted to present a picked up potential in phase opposition to another potential comprising, a variable gain amplifier, a phase shifting network having its input electrically connected with the output of said amplifier, a second phase shifting network having its input electrically connected with the output of the first named network and being provided with an adjustable phase control having an indicating dial, a potentiometer and a milliammeter electrically connected across the output of said second network, whereby the strength and phase of the current across the potentiometer may be regulated, said potentiometer being provided with an adjustable current control having an indicating dial calibrated in units of electric potential, a fixed gain amplifier having its input connected with said potentiometer control, a plurality of potential pickups, and means for electrically connecting said pickups with said amplifiers.

4. An instrument of the character described adapted to present a picked up potential in phase opposition to another potential comprising, a variable gain amplifier, a phase shifting network having its input electrically connected with the output of said amplifier, a second phase shifting network having its input electrically connected with the output of the first named network and being provided with an adjustable phase control having an indicating dial, a potentiometer and a milliammeter electrically connected across the output of said second network, whereby the strength and phase of the current across the potentiometer may be regulated, said potentiometer being provided with an adjustable current control having an indicating dial calibrated in units of electric potential, a fixed gain amplifier having its input electrically connected with said potentiometer control, a plurality of potential pickups, means for electrically connecting said pickups with said amplifiers, and a null indicator electrically connected with the output of the fixed gain amplifier.

5. An instrument of the character described adapted to present a picked up potential in phase opposition to another potential comprising, a variable gain amplifier, a constant potential amplitude phase shifting network having its input electrically connected with the output of said amplifier, a second constant potential amplitude phase shifting network having its input electrically connected with the output of the first named network and being provided with an adjustable phase control having an indicating dial, a potentiometer and a milliammeter electrically connected across the output of said second network, whereby the strength and phase of the current across the potentiometer may be regulated, said potentiometer being provided with an adjustable current control having an indicating dial calibrated in units of electric potential, a fixed gain amplifier having its input electrically connected with said potentiometer control, a plurality of potential pickups, means for electrically connecting said pickups with said amplifiers, and a null indicator electrically connected with the output of the fixed gain amplifier.

6. An instrument of the character described adapted to present a picked up potential in phase opposition to another potential comprising, a variable gain amplifier, a phase shifting network having its input electrically connected with the output of said amplifier, a second phase shifting network having its input electrically connected with the output of the first named network, at least one of said networks being provided with an adjustable phase control, a potentiometer electrically connected across the output of said second network, whereby the strength and phase of the current across the potentiometer may be regulated, a second amplifier having its input electrically connected with said potentiometer, at least three potential pickups, and means for successively electrically connecting different pairs of said pickups with said amplifiers.

7. An instrument of the character described adapted to present a picked up potential in phase opposition to another potential comprising, a variable gain amplifier, a phase shifting network having its input electrically connected with the output of said amplifier, a second phase shifting network having its input electrically connected with the output of the first named network, at least one of said networks being provided with an adjustable phase control, a potentiometer electrically connected across the output of said second network, whereby the strength and phase of the current across the potentiometer may be regulated, a second amplifier having its input electrically connected with said potentiometer, at least three potential pickup terminals, a plurality of induction pickups electrically connected with said terminals, and means for successively electrically connecting different pairs of said terminals with said amplifiers.

8. An instrument of the character described adapted to present a picked up potential in phase opposition to another potential comprising, a variable gain amplifier, a phase shifting network having its input electrically connected with the output of said amplifier, a second phase shifting network having its input electrically connected with the output of the first named network, at least one of said networks being provided with an adjustable phase control, a potentiometer electrically connected across the output of the second network, whereby the strength and phase of the current across the potentiometer may be regulated, a second amplifier having its input electrically connected with said potentiometer, at least three contact potential pickups, a plurality of induction pickups, means for successively electrically connecting different pairs of said contact pickups with said amplifiers, and means for electrically connecting either or both of said induction pickups with said amplifiers.

9. An instrument of the character described adapted to present a picked up potential in phase opposition to another potential comprising, a variable gain amplifier including an electron tube, a primary transformer coil and a gain control electrically interconnected; a phase shifting network including a secondary transformer coil in electric cooperation with said primary coil, an adjustable phase control and a condenser connected in series and with the output terminals of said secondary coil, and a second primary transformer coil having one terminal connected with said control and condenser and its other terminal tapped to said secondary coil; a second phase shifting network including a secondary transformer coil in electric cooperation with the primary coil of the first named network, an adjustable phase control and a condenser connected in series and with the output terminals of said last named secondary coil; a milliammeter and potentiometer connected in series and with said last named control and condenser, and with the tap of said last named secondary coil; a voltage adjusting control for said potentiometer; a fixed gain amplifier having its input connected to said potentiometer control; a null indicator connected with the output of said fixed gain amplifier; an indicating dial for the phase control of said second network; an indicating dial for said potentiometer control calibrated in units of electric potential; three potential pickups; and means for successively connecting different pairs of said pickups with the inputs of said amplifiers.

10. An instrument according to claim 9 which also includes a resistance in the input of the variable gain amplifier.

11. An instrument according to claim 9 which also includes a shunt-out switch connected with the said milliammeter.

12. An instrument according to claim 9 which also includes an amplifying electron tube interposed between and in electric connection with the transformer coils of the first named phase shifting network.

BJARNI S. BJARNASON.

REFERENCES CITED

The following references are of record in the file of this patent:

UNITED STATES PATENTS

| Number    | Name       | Date           |
|-----------|------------|----------------|
| 2,202,885 | Zuschlag   | June 4, 1940   |
| 2,288,310 | Zuschlag   | June 30, 1942  |
| 2,318,248 | Minton     | May 4, 1943    |
| 2,368,551 | Labin      | Jan. 30, 1945  |
| 2,404,643 | Livingston | July 23, 1946  |